(12) United States Patent
Sugiyama et al.

(10) Patent No.: US 7,058,241 B2
(45) Date of Patent: Jun. 6, 2006

(54) OPTICAL MODULATOR

(75) Inventors: Masaki Sugiyama, Kawasaki (JP);
Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/032,212

(22) Filed: Jan. 11, 2005

(65) Prior Publication Data
US 2005/0180694 A1 Aug. 18, 2005

Related U.S. Application Data

(63) Continuation of application No. PCT/JP02/12824, filed on Dec. 6, 2002.

(51) Int. Cl.
*G02F 1/295* (2006.01)
(52) U.S. Cl. ............................ 385/4; 385/8
(58) Field of Classification Search ............. 285/2–9, 285/14–16, 147
See application file for complete search history.

(56) References Cited

U.S. PATENT DOCUMENTS
2002/0159666 A1 * 10/2002 Gates et al. .................. 385/2

FOREIGN PATENT DOCUMENTS
JP 53-90747 8/1978
JP 2-167525 6/1990

OTHER PUBLICATIONS

Nadege Courjal et al., LiNbO3 Mach Zehnder Modulator with chirp adjusted by Ferroelectric domain inversion, IEEE photonics Technology Letters, vol. 14, No. 11, dated Nov. 11, 2002 pp. 1509-1511.*
Nadege Courjal, et al., "LiNbO₃ Mach-Zehnder Modulator With Chirp Adjusted by Ferroelectric Domain Inversion," IEEE Photonics Technology Letters, vol. 14, No. 11, Nov. 2002, pp. 1509-1511.
Weidong Wang, et al., "Bandpass Traveling-Wave Mach-Zehnder Modulator in LiNbO₃ with Domain Reversal," IEEE Photonics Technology Letters, vol. 9, No. 5, May 1997, pp. 610-612.
PCT Search Report for Application PCT/JP02/12824.

* cited by examiner

*Primary Examiner*—Akm Enayet Ullah
(74) *Attorney, Agent, or Firm*—Staas & Halsey LLP

(57) ABSTRACT

The present invention has an object to provide a Mach-Zehnder optical modulator for achieving the reduction of wavelength chirping caused in a modulated light. To this end, according to the present invention, in a Mach-Zehnder optical modulator configured by forming an optical waveguide and a coplanar electrode on a substrate having an electro-optic effect, a polarization inversion region is formed on a part of a portion where lights being propagated through a pair of parallel waveguides and a high frequency electric signal being propagated through a signal electrode interact to each other, and also the signal electrode is arranged on one of the parallel waveguides in the polarization inversion region and is arranged on the other parallel waveguide in a non-inversion region.

20 Claims, 6 Drawing Sheets

(A)

(B)

X-X CROSS SECTION $\Delta n_G < \Delta n_S$

OPTICAL MODULATOR

This application is a continuation of PCT/JP02/12824, filed on Dec. 6, 2002.

BACKGROUND OF THE INVENTION

1. Field of the Invention

The present invention relates to an optical modulator used for an optical communication, and in particular, to a Mach-Zehnder optical modulator using an optical waveguide.

2. Description of the Related Art

For example, as optical waveguide devices using an electro-optic crystal such as lithium niobate ($LiNbO_3$), lithium tantalate ($LiTaO_2$) or the like, a variety of functional devices is formed such that a metallic film is formed on a part of a crystal substrate, to be thermally diffused or to be patterned, then, is proton exchanged in benzoic acid so that an optical waveguide is formed, and thereafter, an electrode is disposed in the vicinity of the optical waveguide. As one of optical waveguide devices using the electro-optical crystals, there has been known a Mach-Zehnder optical modulator having an optical waveguide structure of branching interference type.

FIG. 9 is a configuration diagram showing one example of conventional Mach-Zehnder optical modulators, in which (A) is a plan view and (B) is an X—X cross sectional view.

In FIG. 9, the conventional Mach-Zehnder optical modulator has an optical waveguide structure comprising an incident waveguide 111, a branching section 112, a parallel waveguides 113A and 113B, a multiplexing section 114 and an emission waveguide 115, each formed on a substrate 101, and is provided with a coplanar electrode comprising a signal electrode 121 and an earth electrode 122 disposed on the parallel waveguides 113A and 113B. In this coplanar electrode, in the case where a Z-cut crystal substrate 101 is used for example, in order to utilize a change in refractive index due to an electric field in a Z direction, the signal electrode 121 and the earth electrode 122 are arranged respectively just above the parallel waveguides 113A and 113B. To be specific, the respective electrodes 121 and 122 are patterned on the parallel waveguides 113A and 113B. However, in order to prevent lights being propagated through the parallel waveguides 113A and 113B from being absorbed by the signal electrode 121 and the earth electrode 122, a buffer layer 102 is formed between the crystal substrate 101, and the signal electrode 121 and the earth electrode 122. As the buffer layer 102, $SiO_2$ of 0.2 to 1 μm thickness is used for example.

In the case where the conventional Mach-Zehnder optical modulator as described above is driven at a high speed, the signal electrode 121 is earthed at one end thereof via a resistor to be made a traveling wave electrode, and a high frequency electric signal S, such as a microwave or the like, is applied from the other end of the signal electrode 121. At this time, each refractive index of the parallel waveguides 113A and 113B is changed by $+\Delta n_S$ and $-\Delta n_G$, respectively, due to an electric field E generated between the signal electrode 121 and the earth electrode 122. Therefore, a phase difference between the lights being propagated through the parallel waveguides 113A and 113B is changed, so that a signal light intensity modulated is output from the emission waveguide 114.

Further, it is also possible to obtain an optical response characteristic of broadband, by changing a cross section of the electrode to control the effective refractive index of the microwave, and by matching propagation speeds of the light and the microwave with each other. Moreover, as shown in FIG. 10 for example, there has been known an optical modulator of a configuration in which the configuration of FIG. 9 is connected serially in two stages. In such an optical modulator, a clock signal is given to the signal electrode 121 on the former stage and a data signal is given to the signal electrode 121' on the latter stage, so that a modulated light of RZ (return to zero) format or the like can be generated.

However, the conventional Mach-Zehnder optical modulator as described above has a following problem related to the wavelength chirping. Namely, in the conventional Mach-Zehnder optical modulator, the intensity of the electric field E applied on the respective parallel waveguides 113A and 113B is varied depending on the arrangements of the signal electrode 121. Therefore, a change amount ($\Delta n_S$) in the refractive index of the parallel waveguide 113B near the signal electrode 121 becomes larger than a change amount ($\Delta n_G$) in the refractive index of the parallel waveguide 113A far from the signal electrode 121. As a result, there is caused a problem in that absolute values of phase changes in the respective lights being propagated through the parallel waveguides 113A and 113B are varied, and when a signal is switched from "0" to "1" or from "1" to "0", a wavelength change (wavelength chirping) in the modulated light is caused to degrade a signal waveform after transmitted.

In order to reduce the wavelength chirping, there are a method of using an X-cut crystal substrate, a method of arranging two signal electrodes respectively on the parallel waveguides to push-pull drive the Mach-Zehnder optical modulator, and the like.

In the case where the X-cut crystal substrate is used, it becomes possible to perform the modulation in which the wavelength chirping is not caused, by applying electric fields of +z direction and −z direction respectively on two parallel waveguides. However, since it is impossible to arrange the parallel waveguides just below the signal electrode, there is a drawback in that a distance between the signal electrode and the waveguide is lengthened, and accordingly, a high drive voltage needs to be applied.

Further, in the case where the two signal electrodes are used to perform the push-pull driving, since two connectors for inputting the high frequency electric signal are necessary, and also electric signals whose data is inverted to each other need to be applied on both of the signal electrodes while phases thereof being controlled, there is a drawback in that a circuit configuration of driving system becomes complicated.

The present invention has been accomplished in view of the above problems, and has a first object to provide a Mach-Zehnder optical modulator capable of reducing the wavelength chirping caused in a modulated light. Further, a second object of the present invention is to provide a Mach-Zehnder optical modulator capable of outputting a modulated light in which the desired wavelength chirping is caused.

Note, Japanese Unexamined Patent Publication No. 53-90747 discloses a polarization inversion optical modulator. This polarization inversion optical modulator is configured such that a region whose polarization direction is inverted is disposed in a strip shape within a two-dimensional waveguide and a voltage is applied between two electrodes which are disposed so as to put in parallel the polarization inversion region therebetween, so that a light being propagated through the polarization inversion region is modulated. Such a polarization inversion optical modulator can be used irrespective of single mode or multi mode, and has advantages in that a polarizer or an analyzer is not necessary, the dependence thereof on the temperature is low, and the like. However, the polarization inversion optical modulator described above has basically an optical waveguide structure different from that of the Mach-Zehnder optical modulator, and therefore, does not solve the problems of wavelength chirping as described above. Further, the object of the polarization inversion optical modulator is different from the object of the present invention.

SUMMARY OF THE INVENTION

In order to achieve the above objects, an optical modulator of Mach-Zehnder type according to the present invention comprises: an optical waveguide of a Mach-Zehnder interferometer structure disposed on a substrate having an electro-optic effect; and a signal electrode and an earth electrode disposed along a pair of parallel waveguides positioned between a branching section and a multiplexing section of the optical waveguide, for applying an electric signal on the signal electrode to modulate a light being propagated through the optical waveguide, wherein the substrate includes, in an interaction portion where lights being propagated through the pair of parallel waveguides and the electric signal being propagated through the signal electrode interact to each other, a polarization inversion region which is a part of the interaction portion and whose polarization direction is inverted to a polarization direction of the remaining part of the interaction portion, and the signal electrode is arranged in the vicinity of one of the pair of parallel waveguides in the polarization inversion region of the interaction portion and is arranged in the vicinity of the other parallel waveguide in a non-inversion region, whose polarization direction is not inverted, of the interaction portion.

In the optical modulator of the above configuration, the light incident on the optical waveguide is branched into two lights by the branching section, to be respectively sent to the pair of parallel waveguides. An electric field generated between the signal electrode and the earth electrode according to the electric signal being propagated through the signal electrode is applied on the parallel waveguides, and the refractive index of each of the parallel waveguides is changed due to an electro-optic effect by this electric field so that phases of the lights being propagated through the parallel waveguides are changed respectively. At this time, since the polarization inversion region and the non-inversion region whose polarization directions are opposite to each other are formed in the interaction portion and the arrangement of the signal electrode for the pair of parallel waveguides is changed in each region, a difference between phase change amounts of the lights being propagated through the parallel waveguides is offset, so that the wavelength chirping caused in modulated lights to be multiplexed in the multiplexing section is reduced.

As one aspect of the above optical modulator, the configuration may be such that the polarization inversion region has the length about ½ of the total length of the interaction portion, in a propagation direction of the lights in the pair of parallel waveguides, and the length capable of including the pair of parallel waveguides in a direction perpendicular to the propagation direction of the lights. Thus, the phase modulations, in which absolute values approximately are equal to each other and signs are inverted to each other, are respectively performed in the polarization inversion region and the non-inversion region. As a result, the modulated lights in which the wavelength chirping is approximately zero are generated.

As another aspect of the above optical modulator, the configuration may be such that the polarization inversion region has the length set according to a required value of the wavelength chirping in the propagation direction of the lights in the pair of parallel waveguides, and the length capable of including the pair of parallel waveguides in the direction perpendicular to the propagation direction of the lights. In such a configuration, it becomes possible to obtain modulated lights in each of which the wavelength chirping according to a value required in a system to which the optical modulator is applied.

Other objects, features and advantages of the present invention will become apparent from the following explanation of the embodiments, in conjunction with the appended drawings.

DESCRIPTION OF THE PREFERRED EMBODIMENTS

Figure 1:
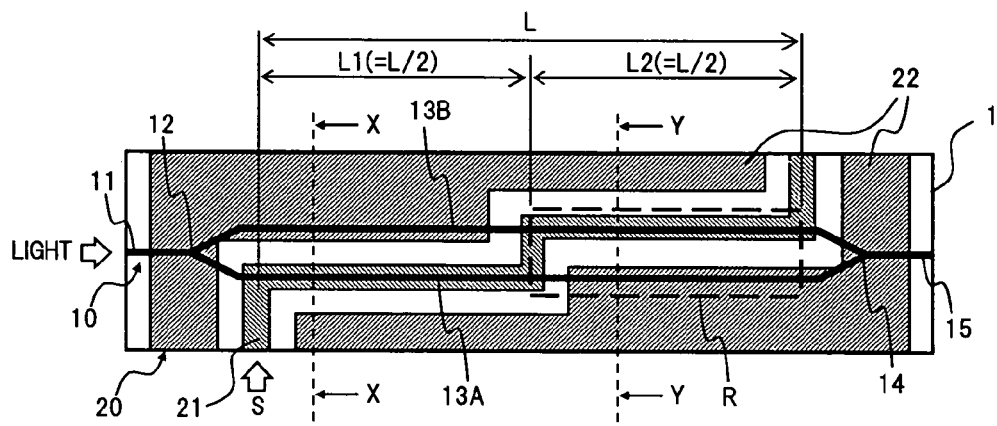
FIG. 1 is a plan view showing a configuration of an optical modulator according to a first embodiment of the present invention.

There will be described embodiments for implementing an optical modulator of the present invention, with reference to the accompanying drawings. The same reference numerals denote the same or equivalent parts in all drawings.

FIG. 1 is a plan view showing a configuration of a Mach-Zehnder optical modulator according to a first embodiment of the present invention. Further, FIG. 2 is a diagram showing an essential structure of a cross section in each part of FIG. 1, in which (A) is an X—X cross section and (B) is a Y—Y cross section.

Figure 2:
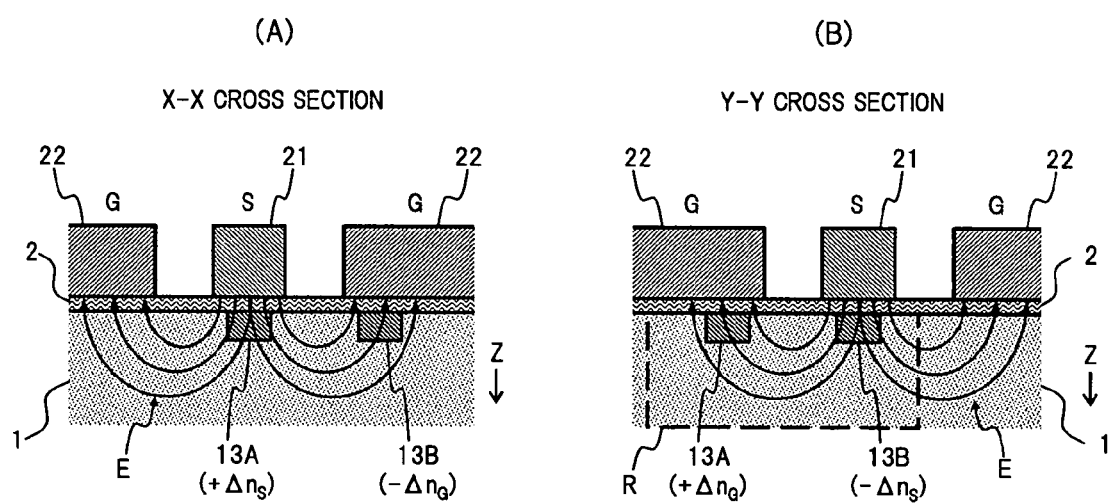
FIG. 2 is a diagram showing an essential structure of a cross section in each part of FIG. 1.

In FIG. 1 and FIG. 2, the optical modulator in the present embodiment comprises a substrate 1 which has an electro-optic effect and is provided with a region R whose polarization direction is inverted, an optical waveguide 10 of branching interference type formed on the surface of the substrate 1, and a coplanar electrode 20 formed on the surface of the substrate 1 via a buffer layer 2.

The substrate 1 is configured such that the known processing such as the titanium (Ti) diffusion or the proton exchange is performed on a Z-cut LiNbO$_3$ substrate or the like, to form the optical waveguide 10, and thereafter, the polarization direction of the region R (region encircled by broken line in each of FIG. 1 and (B) of FIG. 2), which is the latter part of a portion (to be referred to as an interacting portion) where a light being propagated through the optical waveguide 10 and a high frequency electric signal S being propagated through the coplanar electrode 20 interact to each other, is inverted to a polarization direction of the remaining region of the portion. Herein, the region R of the interacting portion, whose polarization direction is inverted, is called a polarization inversion region while the region, whose polarization direction is not inverted, is called a non-inversion region. The polarization inversion region R can be formed by patterning the substrate by resist or the like and thereafter applying a high pulsed electric field on the patterned substrate. Further, in the case where the total length in a lengthwise direction (propagation direction of the light) of the interacting portion is L, the polarization inversion region R has the length of about L/2 in the propagation direction of the light and the length capable of including two branched parallel optical waveguides 13A and 13B in a direction perpendicular to the propagation direction of the light.

Figure 9:
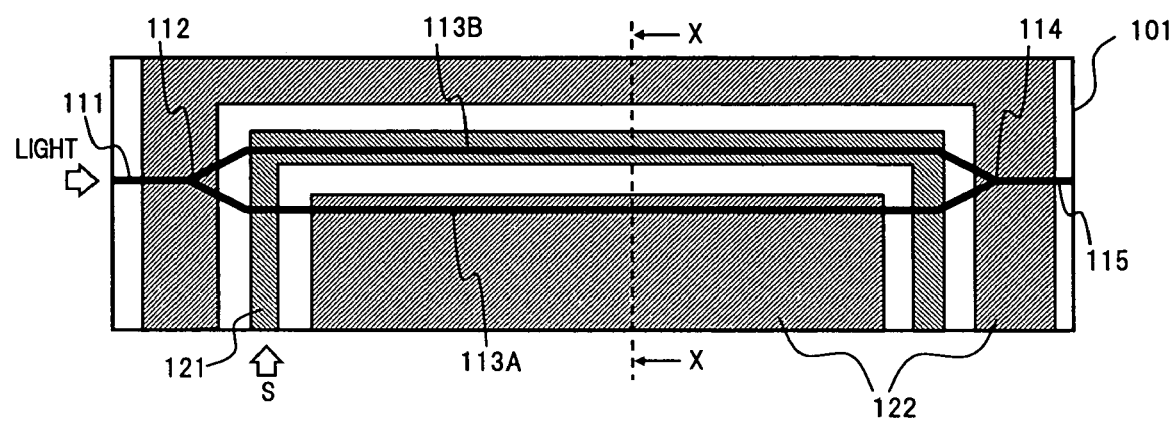
FIG. 9 is a diagram showing a configuration example of a conventional Mach-Zehnder optical modulator.
Figure 9:
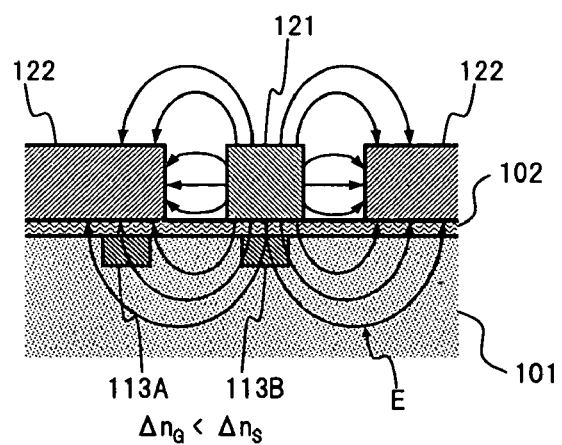
Figure 10:
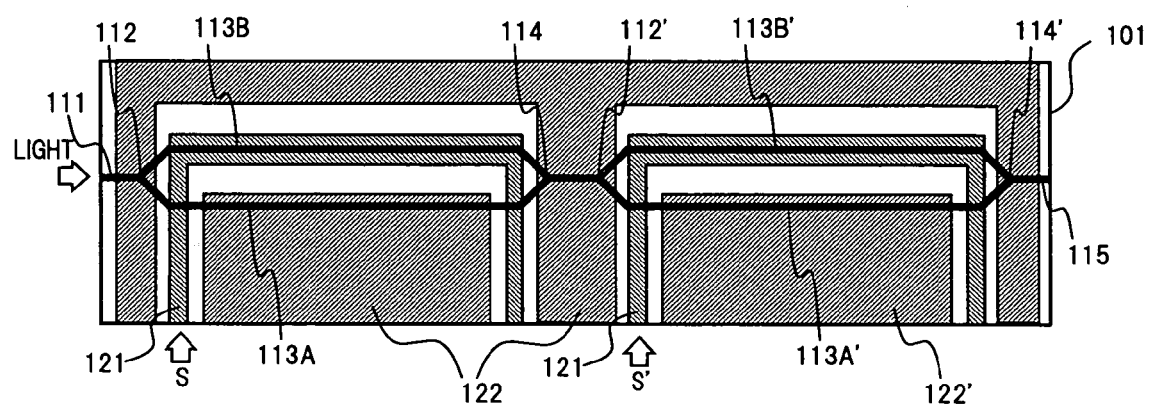
FIG. 10 is a plan view showing a configuration example of a Mach-Zehnder optical modulator corresponding to RZ format.

Similarly to a conventional configuration shown in FIG. 9, the optical waveguide 10 includes an incident waveguide 11, a branching section 12, the parallel waveguides 13A and 13B, a multiplexing section 14 and an emission waveguide 15, to constitute a Mach-Zehnder interferometer. The optical waveguide 10 is formed on a −Z plane of the substrate 1 by the processing of thermal diffusion, proton exchange or the like in the same manner as in the conventional technology. An optical incident end (one end positioned on the left side in FIG. 1) of the incident waveguide 11 and an optical emission end (one end positioned on the right side in FIG. 1) of the emission waveguide 15 respectively reach opposing side faces of the substrate 1. Note, as shown in FIG. 2, herein, a profile of the optical waveguide 10 is rectangular. However, the profile of the optical waveguide in the present invention is not limited to the above one example.

The coplanar electrode 20 includes a signal electrode 21 and an earth electrode 22. As shown in FIG. 1 for example, the signal electrode 21 is patterned to be of a required shape so as to pass over the parallel waveguide 13A in the non-inversion region of the substrate 1 while passing over the parallel waveguide 13B in the polarization inversion region R. On the other hand, the earth electrode 22 is patterned to be of a required shape, with a fixed distance from the signal electrode 21, so as to pass over the parallel waveguide 13B in the non-inversion region of the substrate 1 while passing over the parallel waveguide 13A in the polarization inversion region R. The signal electrode 21 is earthed via a resistor (not shown in the figure) at an output end thereof positioned on the upper right of FIG. 1, to be made a traveling wave electrode, and the high frequency electric signal S corresponding to modulation data is applied on the signal electrode 21 via an input end thereof positioned on the lower left of FIG. 1.

The buffer layer 2 formed between the coplanar electrode 20 and the surface of the substrate 1 is for preventing the light being propagated through the optical waveguide 10 from being absorbed by the coplanar electrode 20. To be specific, SiO$_2$ of 0.2 to 1 μm thickness can be used for the buffer layer 2.

Next, there will be described an operation of the optical modulator in the first embodiment.

In the present optical modulator, a continuous light given from the outside to the incident waveguide 11 is branched into two lights by the branching section 12, to be respectively sent to the parallel waveguides 13A and 13B. The parallel waveguides 13A and 13B are applied with an electric field E (arrow in FIG. 2) generated between the signal electrode 21 and the earth electrode 22 according to the high frequency electric signal S traveling in the signal electrode 21, and the refractive index of each of the parallel waveguides 13A and 13B is changed due to an electro-optic effect caused by the electric field E. As a result, phases of the lights being propagated through the parallel waveguides 13A and 13B are respectively changed.

At this time, if the polarization inversion region R is formed so that the length L1 of the non-inversion region is approximately equal to the length L2 of the polarization inversion region R in the lengthwise direction (total length L) of the interaction portion, that is, so that a relationship of L1=L2=L/2 is established as an ideal state, the phase of the light being propagated through the parallel waveguide 13A is changed by $\theta_A$ shown in the equation (1), while the phase of the light being propagated through the parallel waveguide 13B is changed by $\theta_B$ shown in the equation (2).

$$\theta_A = (+\Delta n_S) \cdot L1 + (+\Delta n_G) \cdot L2 = +(\Delta n_S + \Delta n_G) \cdot L/2 \qquad (1)$$

$$\theta_B = (-\Delta n_G) \cdot L1 + (-\Delta n_S) \cdot L2 = -(\Delta n_S + \Delta n_G) \cdot L/2 \qquad (2)$$

Note, $\Delta n_S$ is a refractive index change amount of the parallel waveguide positioned below the signal electrode 21, and $\Delta n_G$ is a refractive index change amount of the parallel waveguide positioned below the earth electrode 22.

As is apparent from the equations (1) and (2), the phases of the lights being propagated through the parallel waveguides 13A and 13B are respectively changed by $(+\Delta n_S) \cdot L1$ and $(-\Delta n_G) \cdot L1$ in the non-inversion region, and are respectively changed by $(+\Delta n_G) \cdot L2$ and $(-\Delta n_S) \cdot L2$ in the polarization inversion region R. Accordingly, the phases of the lights which pass through the parallel waveguides 13A and 13B to reach the multiplexing section 14 are respectively changed by $+(\Delta n_S + \Delta n_G) \cdot L/2$ and $-(\Delta n_S + \Delta n_G) \cdot L/2$, and therefore, the phase modulations, in which absolute values are approximately equal to each other and signs are inverted to each other, are respectively performed.

Therefore, the wavelength chirping conventionally caused in a modulated light in a Mach-Zehnder optical modulator using a Z-cut substrate can be made approximately zero.

Figure 3:
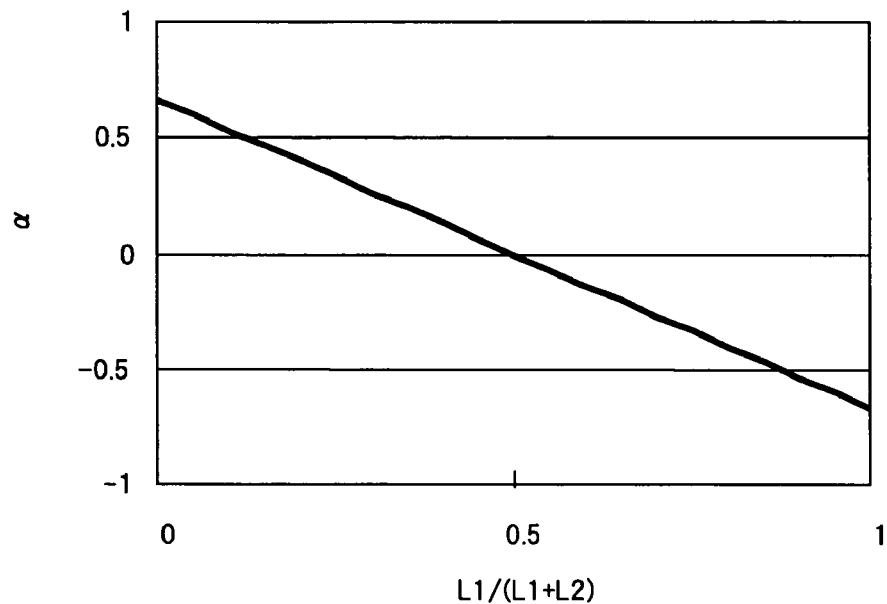
FIG. 3 is a graph exemplarily showing a relationship between the length of a non-inversion region and the wavelength chirping in the first embodiment.

FIG. 3 is a graph exemplarily showing a relationship between the length of the non-inversion region (or the polarization inversion region R) and the caused wavelength chirping. Herein, a ratio of the length L1 of the non-inversion region to the total length L (=L1+L2) of the interaction portion is in a transverse axis, and a value of α parameter showing the caused wavelength chirping is in a longitudinal axis. It is understood from FIG. 3 that the value of α parameter becomes 0 and as a result, the wavelength chirping is not caused, when L1/L=0.5, that is, the length L1 of the non-inversion region is equal to the length L2 of the polarization inversion region R.

As described in the above, according to the first embodiment, in the Mach-Zehnder optical modulator using the Z-cut substrate, the polarization inversion region R is disposed on the latter part of the interaction portion and the signal electrode 21 and the earth electrode 22 are patterned according to the polarization inversion region R. As a result, it becomes possible to realize an optical modulator which suppresses the wavelength chirping to approximately zero by merely applying the high frequency electric signal on a single signal electrode, without the need of applying the high frequency electric signal on two signal electrodes as in the conventional push-pull driving. Further, in the present optical modulator, since the optical waveguide can be arranged just below the signal electrode 21 using the Z-cut substrate, it is possible to reduce a drive voltage compared with a conventional optical modulator which uses an X-cut substrate to suppress the wavelength chirping.

Note, in the above first embodiment, the polarization inversion region R is formed on the latter part of the interaction portion. However, the polarization inversion region R may be formed on the former part of the interaction portion.

Further, the signal electrode 21 is arranged on the parallel waveguide 13A in the non-inversion region and is arranged on the parallel waveguide 13B in the polarization inversion region R. However, it is surely possible to make the arrangement of the signal electrode 21 in the non-inversion region and the polarization inversion region R reverse to the above arrangement.

Moreover, the length L1 of the non-inversion region is made to be approximately equal to the length L2 of the polarization inversion region R, to suppress the wavelength chirping. However, for example, in the case where there is a difference between an electro-optic constant of the polarization inversion region R and an electro-optic constant of the non-inversion region, the length L2 of the polarization inversion region R may be adjusted according to the difference to suppress the wavelength chirping.

Next, a second embodiment of the present invention will be described.

In the above described first embodiment, the length of the polarization inversion region R has been designed for the purpose of suppressing the wavelength chirping caused in the Mach-Zehnder optical modulator to approximately zero. However, there is a case where a required value of the wavelength chirping is not zero, depending on systems to which the present optical modulator is applied. Therefore, in the second embodiment, an optical modulator corresponding to the above case will be described.

Figure 4:
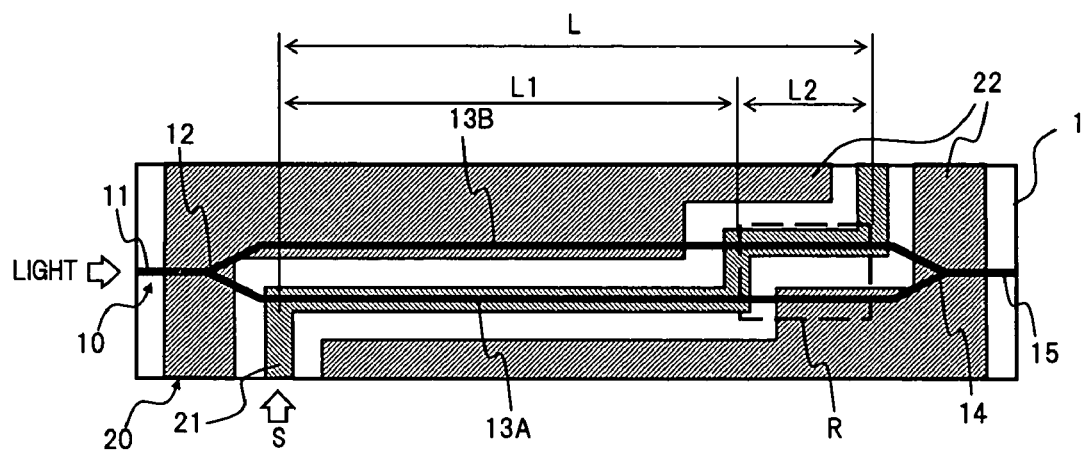
FIG. 4 is a plan view showing a configuration of an optical modulator according to a second embodiment of the present invention.

FIG. 4 is a plan view showing a configuration of a Mach-Zehnder optical modulator in the second embodiment.

In FIG. 4, the configuration of the present Mach-Zehnder optical modulator differs from the configuration in the first embodiment shown in FIG. 1 in that the length L2 in the polarization direction of the light of the polarization inversion region R formed on the substrate 1 is modified according to a value of the wavelength chirping required in a system, and also the patterning of the signal electrode 21 and the earth electrode 22 is modified corresponding to the modification of the polarization inversion region R. The configuration other than the above is similar to the configuration in the first embodiment, and accordingly, the description thereof is omitted.

As exemplarily shown in FIG. 3, it is understood that the ratio of the length L1 of the non-inversion region or the length L2 of the polarization inversion region R to the total length L in the lengthwise direction of the interaction portion is changed, so that the value of the wavelength chirping ($\alpha$ parameter) caused in the modulated light is changed (a change range of −0.7 to +0.7 in the example of FIG. 3). Therefore, in the present embodiment, a ratio of L1/L or L2/L corresponding to the required value of the wavelength chirping is obtained, and then the polarization inversion region R is formed on a required portion (portion on the emission side in FIG. 4) on the substrate 1 in accordance with the obtained ratio. Further, the coplanar electrode 20 is patterned corresponding to the arrangement of the polarization inversion region R, so that the signal electrode 21 is positioned on the parallel waveguide 13A in the non-inversion region and is positioned on the parallel waveguide 13B in the polarization inversion region R. As a result, in the present optical modulator, a modulated light in which the wavelength chirping approximately coincident with the required value of the system is caused, is emitted from the emission waveguide 15.

According to the second embodiment as described above, by using the Mach-Zehnder optical modulator using the Z-cut substrate 1, it becomes possible to easily obtain a modulated light in which the wavelength chirping of desired value is caused.

Note, in the second embodiment, one example has been shown in FIG. 4, in which the length L2 of the polarization inversion region R is made to be shorter than the length L1 of the non-inversion region. However, it is surely possible to make the length L2 of the polarization inversion region R to be longer than the length L1 of the non-inversion region, to realize the required value of the wavelength chirping.

Next, a third embodiment of the present invention will be described.

Figure 5:
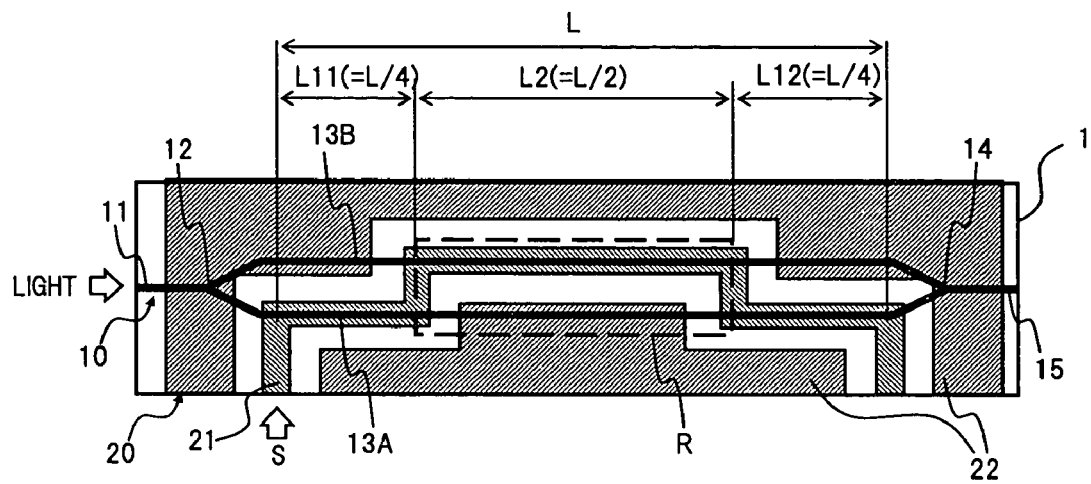
FIG. 5 is a plan view showing a configuration of an optical modulator according to a third embodiment of the present invention.

FIG. 5 is a plan view showing a configuration of a Mach-Zehnder optical modulator in the third embodiment.

In FIG. 5, the configuration of the present Mach-Zehnder optical modulator differs from the configuration in the first embodiment shown in FIG. 1 in that the polarization inversion region R is formed on the center portion in the lengthwise direction of the interaction portion on the substrate 1 so that the non-inversion regions are formed on the front and rear portions (the left and right sides in FIG. 5) of the polarization inversion region R, and the patterning of the coplanar electrode 20 is modified so that the signal electrode 21 is positioned on the parallel waveguide 13A in the non-inversion regions and is positioned on the parallel waveguide 13B in the polarization inversion region R. The configuration other than the above is similar to the configuration in the first embodiment, and accordingly, the description thereof is omitted.

Generally, it is known that a propagation loss of electric signal given to a coplanar line is increased as a frequency of the electric signal is increased. Therefore, in the case where the high frequency electric signal S is given to the signal electrode 21 of the coplanar electrode 20, to drive the present optical modulator at a high speed, as the high frequency electric signal S travels through the signal electrode 21, the intensity thereof is attenuated. As a result, an interacting state between the lights being propagated through the parallel waveguides 13A and 13B on the incident side differs from that on the emission side. Accordingly, in such a configuration as in the above described first embodiment in which the length of the non-inversion region is set to be approximately equal to the length of the polarization inversion region R, and one of the regions is arranged on the incident side while the other region is arranged on the emission side, since there is caused a difference between the phase change of the light in the non-inversion region and the phase change of the light in the polarization inversion region R, there is a possibility that the wavelength chirping becomes hard to be suppressed.

Contrary to the above, by forming the polarization inversion region R with the length of L/2 on the center portion of the interaction portion as in the present embodiment, an absolute value of phase difference is corrected at each of the former part and the latter part of the interaction portion. As a result, even in a driving state where the propagation loss in the coplanar electrode 20 becomes large, it becomes possible to reliably suppress the wavelength chirping.

Figure 6:
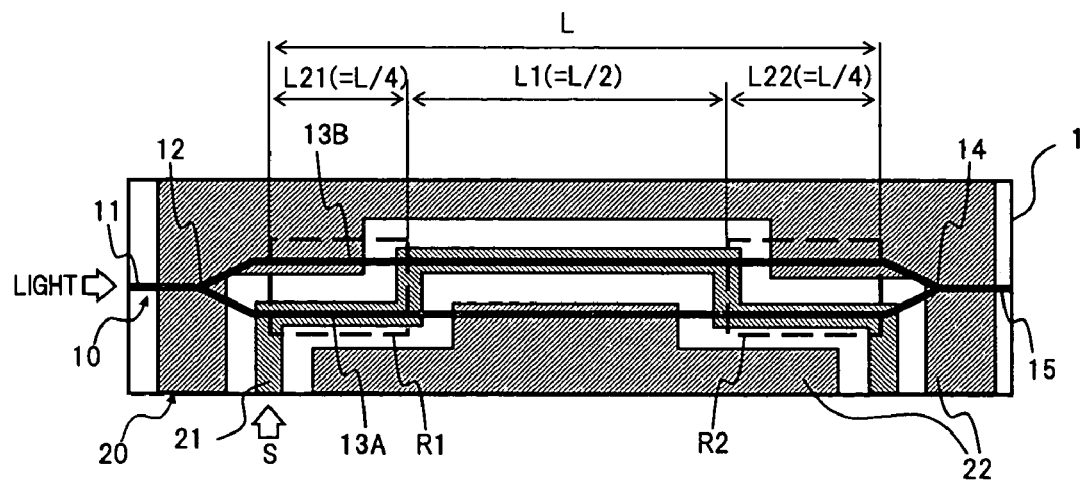
FIG. 6 is a plan view showing another configuration related to the third embodiment.

Note, in the above described third embodiment, the polarization inversion region R is formed on the center portion of the interaction portion. However, an effect same as that in the above case can be achieved, even if the configuration is such that polarization inversion regions R1 and R2 with the length of L/4 are respectively formed on the incident side and the emission side of the interaction portion, and the center portion of the interaction portion is made the non-inversion region with the length of L/2, as shown in FIG. 6 for example. Further, herein the phase difference is corrected at two points, the former part and the latter part of the interaction portion. However, the present invention is not limited thereto, and the configuration may be such that three or more combinations of the non-inversion region and the polarization inversion region are sequentially arranged in the lengthwise direction of the interaction portion, so that the phase difference is corrected at three or more points. According to such a configuration, it becomes possible to suppress more reliably the wavelength chirping.

Next, a fourth embodiment of the present invention will be described.

Figure 7:
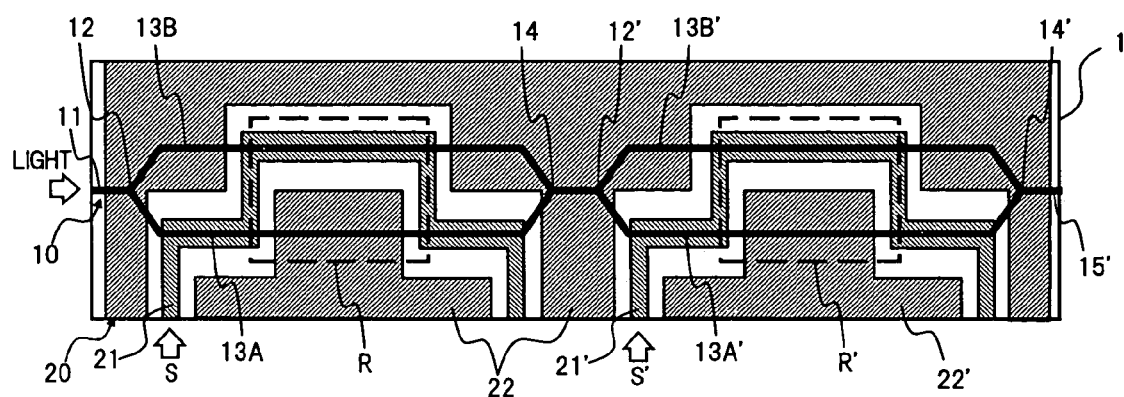
FIG. 7 is a plan view showing a configuration of an optical modulator according to a fourth embodiment of the present invention.

FIG. 7 is a plan view showing a configuration of a Mach-Zehnder optical modulator in the fourth embodiment.

In FIG. 7, the Mach-Zehnder optical modulator in the fourth embodiment is obtained such that the configuration of the third embodiment shown in FIG. 5 is connected serially in two stages to configure a single optical modulator. In this optical modulator, for example a clock signal is used as the high frequency electric signal S applied on the former stage signal electrode 21, and a data signal is used as a high frequency electric signal S' applied on a latter stage signal electrode 21', so that an optical signal modulated in accordance with RZ format or the like is generated. As a result, it becomes possible to easily obtain an optical signal of RZ format in which the wavelength chirping is suppressed, by the Mach-Zehnder optical modulator using the Z-cut substrate.

Note, in the above fourth embodiment, one example has been described in which the configuration shown in FIG. 5 is connected serially in two stages. However, it is also possible to make the configuration shown in FIG. 4 or FIG. 6 a two-staged configuration. Further, the RZ format has been exemplarily shown as a sign format of the optical signal generated by the two-staged Mach-Zehnder optical modulator. However, the sign format of the modulated light obtained by the optical modulator of the present invention is not limited to the above one example.

Figure 8:
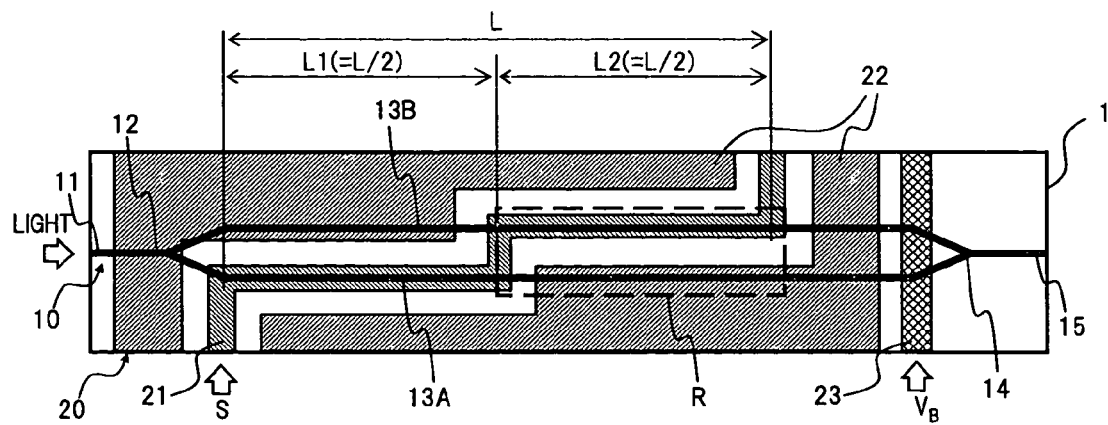
FIG. 8 is a plan view showing a configuration of an application example related to each of the above embodiments.

Moreover, in the above first to fourth embodiments, there have been described the case where the high frequency electric signal is given to the coplanar electrode 20, to drive the Mach-Zehnder optical modulator at a high speed. However, it is possible to apply the present invention to a configuration in which an electrode 23 for giving a required bias voltage $V_B$ to the substrate 1 is disposed, separately from the coplanar electrode 20, and the bias voltage $V_B$ is adjusted to compensate for the drift at an operating point, as shown in FIG. 8 for example. In this case, the total length L of the interaction portion is equivalent to the length of a portion where the lights being propagated through the parallel waveguides 13A and 13B, and the high frequency electric signal S being propagated through the signal electrode 21 of the coplanar electrode 20, interact to each other, but is different from the length including up to the electrode 23 on which the bias voltage $V_B$ is applied.

INDUSTRIAL APPLICABILITY

According to the present invention, it is possible to provide an optical modulator capable of generating an optical signal in which the wavelength chirping is reduced or an optical signal having desired wavelength chirping with a drive voltage lower than that in a system using an X-cut substrate without the necessity of push-pull driving a Mach-Zehnder optical modulator, and thus has a large industrial applicability.

What is claimed is:

1. An optical modulator of Mach-Zehnder type comprising:
an optical waveguide of a Mach-Zehnder interferometer structure disposed on a substrate having an electro-optic effect; and
a signal electrode and an earth electrode disposed along a pair of parallel waveguides positioned between a branching section and a multiplexing section of said optical waveguide, for applying an electric signal on said signal electrode to modulate a light being propagated through said optical waveguide, wherein
said substrate includes, in an interaction portion where lights being propagated through said pair of parallel waveguides and the electric signal being propagated through said signal electrode interact with each other, a polarization inversion region which is a part of said interaction portion and whose polarization direction is inverted with respect to a polarization direction of the remaining part of said interaction portion,
said signal electrode is arranged in the vicinity of one of said pair of parallel waveguides in the polarization inversion region of said interaction portion and is arranged in the vicinity of the other parallel waveguide in a non-inversion region, whose polarization direction is not inverted, of said interaction portion, and
said polarization inversion region is located such that the center of said polarization inversion region approximately coincides with the center position of the interaction portion in the propagation direction of the lights.

2. An optical modulator according to claim 1,
wherein said polarization inversion region has the length about ½ of the total length of said interaction portion, in a propagation direction of lights in said pair of parallel waveguides, and the length capable of including said pair of parallel waveguides in a direction perpendicular to the propagation direction of the lights.

3. An optical modulator of the Mach-Zehnder type comprising:
an optical waveguide of a Maeh-Zehnder interferometer structure disposed on a substrate having an electro-optic effect; and
a signal electrode and an earth electrode disposed along a pair of parallel waveguides positioned between a branching section and a multiplexing section of said optical waveguide, for applying an electric signal on said signal electrode to modulate a light being propagated through said optical waveguide wherein
said substrate includes, in an interaction portion where lights being propagated through said pair of parallel waveguides and the electric signal being propagated through said signal electrode interact with each other, a polarization inversion region which is a part of said interaction portion and whose polarization direction is inverted with respect to a polarization direction of the remaining Part of said interaction portion, said signal electrode is arranged in the vicinity of one of said pair of parallel waveguides in the polarization inversion region of said interaction portion and is arranged in the vicinity of the other parallel waveguide in a non-inversion region, whose polarization direction is not inverted, of said interaction portion, and said interaction portion is provided for arranging therein said polarization inversion region and said non-inversion region such that the total number of regions of said polarization inversion and non-inversion regions is equal to or larger than three, and that the sum of the length of either said polarization inversion region or said non-inversion region in the propagation direction of the lights is about ½ of the total length of said interaction portion.

4. An optical modulator of the Mach-Zehnder type comprising:

an optical waveguide of a Mach-Zehnder interferometer structure disposed on a substrate having an electro-optic effect; and a signal electrode and an earth electrode disposed along a pair of parallel waveguides positioned between a branching section and a multiplexing section of said optical waveguide, for applying an electric signal on said signal electrode to modulate a light being propagated through said optical waveguide wherein said substrate includes, in an interaction portion where lights being propagated through said pair of parallel waveguides and the electric signal being propagated through said signal electrode interact with each other, a polarization inversion region which is a part of said interaction portion and whose polarization direction is inverted with respect to a polarization direction of the remaining part of said interaction portion, said signal electrode is arranged in the vicinity of one of said pair of parallel waveguides in the polarization inversion region of said interaction portion and is arranged in the vicinity of the other parallel waveguide in a non-inversion region, whose polarization direction is not inverted, of said interaction portion, and said polarization inversion region is divided into a plurality of small regions to be arranged in said interaction portion, and the sum of the length of said plurality of small regions in the propagation direction of the lights is a value according to the required value of said wavelength chirping.

5. An optical modulator configured by setting an optical modulator recited in claim 1 as one unit configuration to connect serially said unit configuration in plural numbers.

6. An optical modulator according to claim 1, further comprising;

a bias electrode for giving an electric field according to a bias voltage to said substrate, wherein a high frequency electric signal which is changed according to modulation data is applied on said signal electrode.

7. An optical modulator according to claim 1, wherein said signal electrode and said earth electrode are disposed on the surface of said substrate via a buffer layer.

8. An optical modulator according to claim 1, wherein said substrate is a Z-cut lithium niobate substrate.

9. An optical modulator according to claim 8, wherein said optical waveguide is formed on a −Z plane of said substrate.

10. An optical modulator configured by setting an optical modulator recited in claim 3 as one unit configuration to connect serially said unit configuration in plural numbers.

11. An optical modulator according to claim 3, further comprising;

a bias electrode for giving an electric field according to a bias voltage to said substrate, wherein a high frequency electric signal which is changed according to modulation data is applied on said signal electrode.

12. An optical modulator according to claim 3, wherein said signal electrode and said earth electrode are disposed on the surface of said substrate via a buffer layer.

13. An optical modulator according to claim 3, wherein said substrate is a Z-cut lithium niobate substrate.

14. An optical modulator according to claim 13, wherein said optical waveguide is formed on a −Z plane of said substrate.

15. An optical modulator configured by setting an optical modulator recited in claim 4 as one unit configuration to connect serially said unit configuration in plural numbers.

16. An optical modulator according to claim 4, further comprising;

a bias electrode for giving an electric field according to a bias voltage to said substrate, wherein a high frequency electric signal which is changed according to modulation data is applied on said signal electrode.

17. An optical modulator according to claim 4, wherein said signal electrode and said earth electrode are disposed on the surface of said substrate via a buffer layer.

18. An optical modulator according to claim 4, wherein said substrate is a Z-cut lithium niobate substrate.

19. An optical modulator according to claim 18, wherein said optical waveguide is formed on a −Z plane of said substrate.

20. An optical modulator of Mach-Zehnder type, comprising:

an optical waveguide of a Mach-Zehnder interferometer structure disposed on a substrate having an electro-optic effect; and a signal electrode and an earth electrode disposed along a pair of parallel waveguides positioned between a branching section and a multiplexing section of said optical waveguide, wherein said substrate includes, in an interaction portion, a polarization inversion region whose polarization direction is inverted with respect to a polarization direction of the remaining part of said interaction portion, said signal electrode is arranged in the vicinity of one of said pair of parallel waveguides in the polarization inversion region and is arranged in the vicinity of the other parallel waveguide in a non-inversion region, and said polarization inversion region is located such that the center of said polarization inversion region approximately coincides with the center position of the interaction portion in the propagation direction of lights.

* * * * *

UNITED STATES PATENT AND TRADEMARK OFFICE
CERTIFICATE OF CORRECTION

| | | |
|---|---|---|
| PATENT NO. | : 7,058,241 B2 | Page 1 of 1 |
| APPLICATION NO. | : 11/032212 | |
| DATED | : June 6, 2006 | |
| INVENTOR(S) | : Masaki Sugiyama et al. | |

It is certified that error appears in the above-identified patent and that said Letters Patent is hereby corrected as shown below:

On Title Page, Item 56
Page 1, second column, line 1 of OTHER PUBLICATIONS, delete "LiNbO3 Mach Zehinder" and insert --LiNbO3 Mach-Zehnder--

Column 10, line 52, delete "Maeh-Zehnder" and insert --Mach-Zehnder--

Column 11, line 3, delete "Part" and insert --part--

Signed and Sealed this

Twenty-first Day of November, 2006

JON W. DUDAS
*Director of the United States Patent and Trademark Office*